Figure 1:
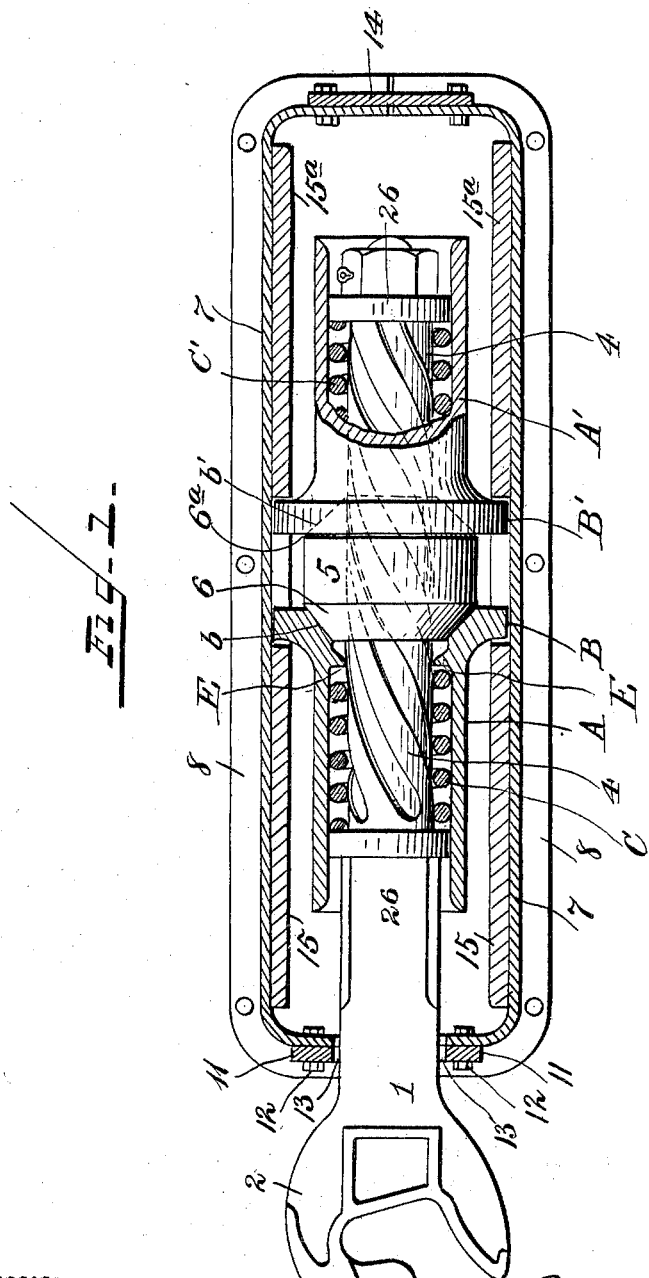

No. 759,563. PATENTED MAY 10, 1904.
E. G. SHORTT.
BRAKE DEVICE.
APPLICATION FILED OCT. 14, 1903.
NO MODEL. 3 SHEETS—SHEET 1.

Witnesses:
F. L. Ourand
Wm. H. Ourand

Inventor
Edward G. Shortt
Fred E. Tasker
By his Attorney

No. 759,563. PATENTED MAY 10, 1904.
E. G. SHORTT.
BRAKE DEVICE.
APPLICATION FILED OCT. 14, 1903.
NO MODEL. 3 SHEETS—SHEET 2.
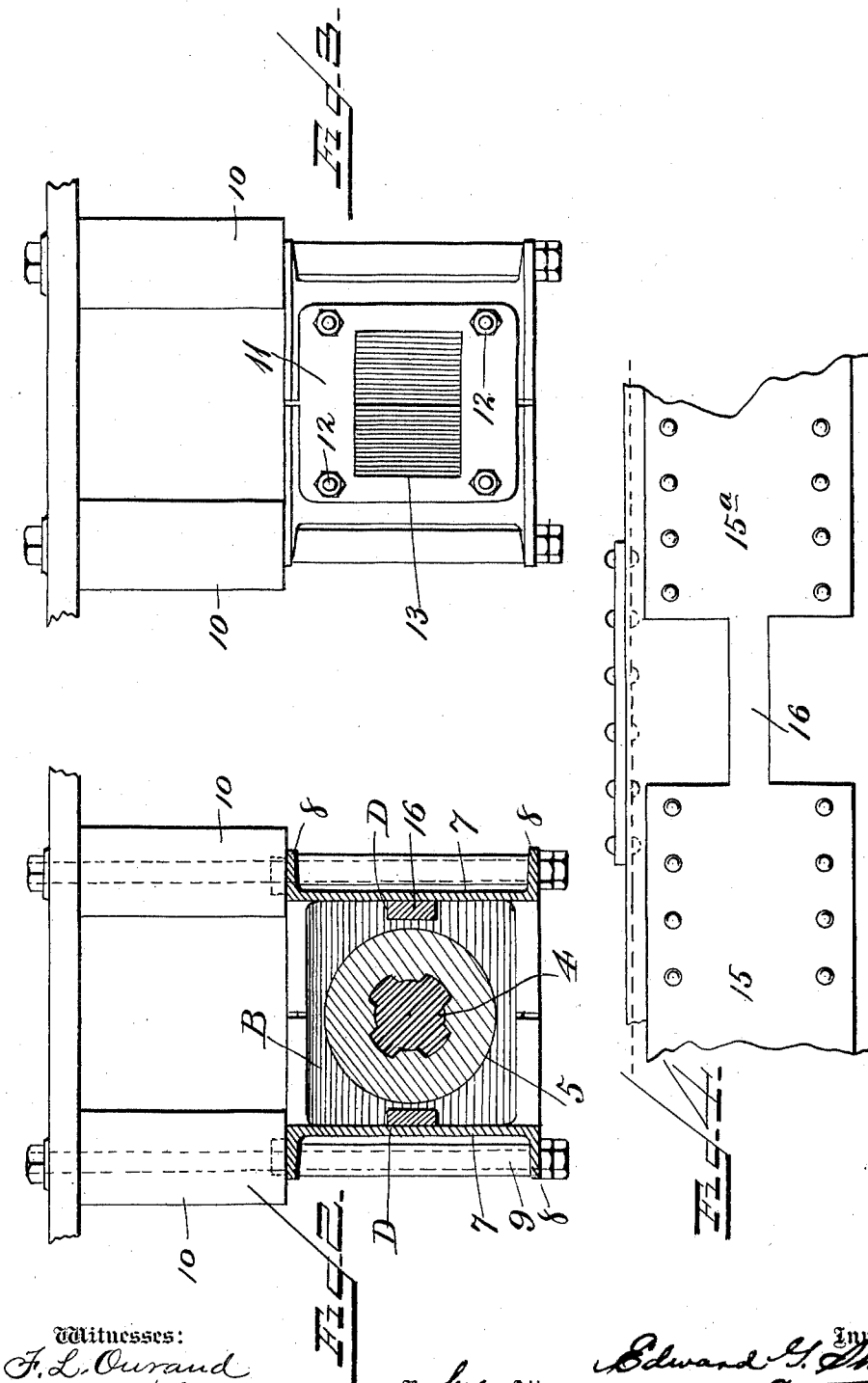

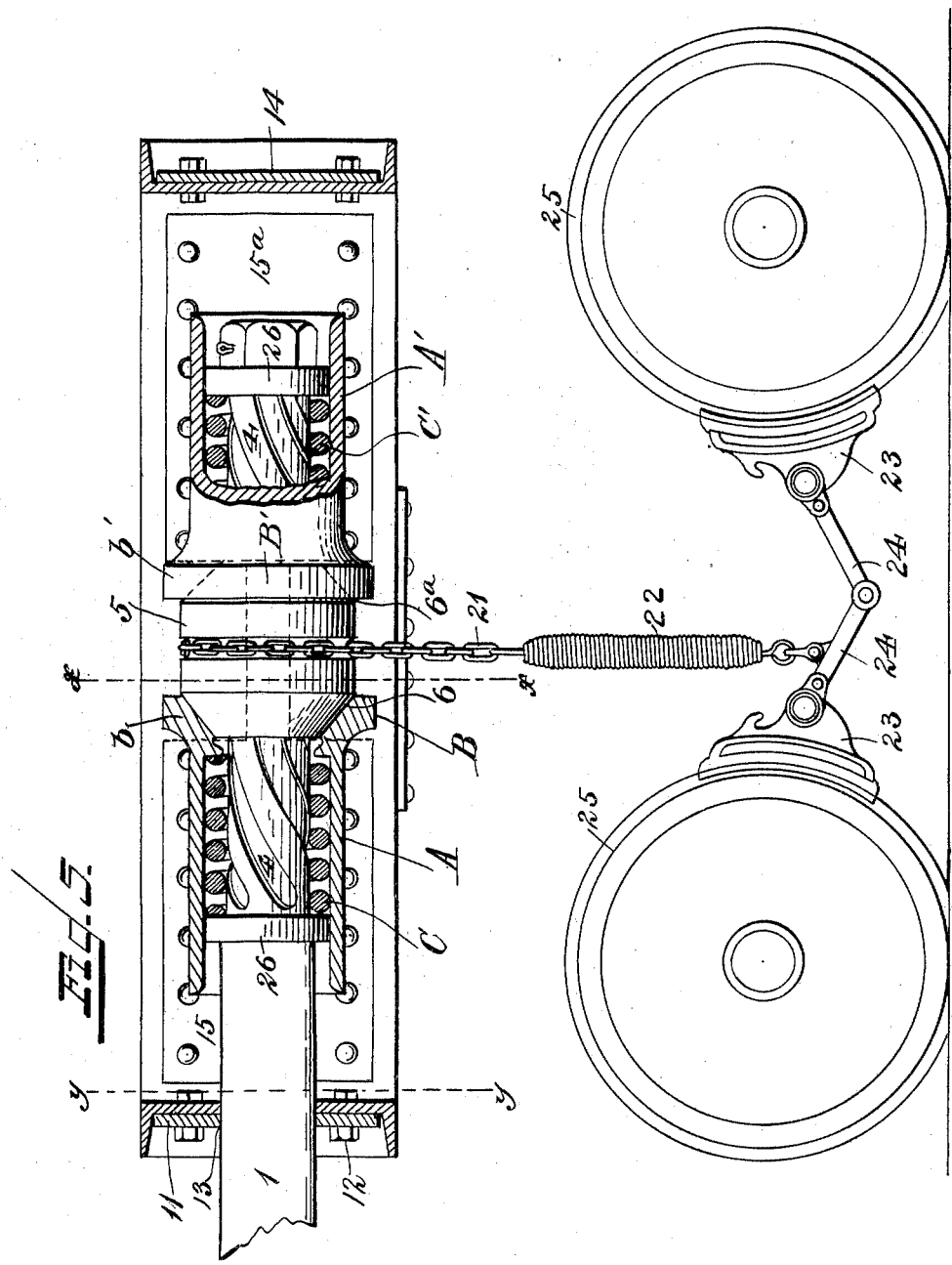

No. 759,563. Patented May 10, 1904.

UNITED STATES PATENT OFFICE.

EDWARD G. SHORTT, OF CARTHAGE, NEW YORK, ASSIGNOR TO CHARLES GOODWIN EMERY, OF CLAYTON, NEW YORK.

BRAKE DEVICE.

SPECIFICATION forming part of Letters Patent No. 759,563, dated May 10, 1904.

Application filed October 14, 1903. Serial No. 176,998. (No model.)

*To all whom it may concern:*

Be it known that I, EDWARD G. SHORTT, a citizen of the United States of America, and a resident of Carthage, in the county of Jefferson and State of New York, have invented certain new and useful Improvements in Brake Devices, of which the following is a specification.

My invention has reference to mechanism regulating the speed of machinery by reducing or graduating the velocity or speed and decreasing or minimizing the effect of shocks, blows, or recoils in the operative or movable parts of machines, vehicles, carriages, and other things requiring such a control.

A common and primary use of my present novel improvements will be found in railway-car service in connection with coupler contrivances and with brake mechanisms; but this is only one of many practical applications that may be made.

The invention consists, essentially, in a rod or part having a rectilineal pull or push, which rod is spirally grooved, in combination with a friction-wheel thereon having a plurality of friction-faces to allow of action in two directions, which engage yielding resistance-casings that retard the rotation of the friction-wheel with a power proportionate to the rotative tendency of the wheel under the endwise movement of the spirally-grooved rod.

Also it embraces a combination, with said friction-wheel and its rotating and retarding accessories, of a brake-shoe-applying device, and also the invention covers numerous details and peculiarities in the construction, arrangement, and combination of the various mechanical parts, substantially as will be hereinafter described and claimed.

In the accompanying drawings, illustrating my invention, Figure 1 is a longitudinal horizontal section of my improvements in means for controlling velocity and decreasing shocks and recoil, &c. Fig. 2 is a cross-section on the lines $x$ $x$ of Fig. 5. Fig. 3 is a cross-sectional end view on the line $y$ $y$ of Fig. 5. Fig. 4 is a partial side view of one of the frame-plates and the inner plate bolted thereto. Fig. 5 is a vertical longitudinal sectional view of my improved device and represents the arrangement of the device in combination with means for applying the brake-shoes to the wheels of a car.

Like characters of reference designate like parts throughout all the different figures of the drawings.

1 denotes a draw-bar, 2 the draw-head, and 3 the pivoted knuckle, of a car-coupler of the ordinary type, the same being given here by way of example in order to illustrate the application of the invention to railway-car service; but I am by no means to be restricted to this single field, but reserve the liberty of adapting and applying the invention wherever it is found serviceable. The inner end of the draw-bar 1 is formed integral with or rigidly attached to a rod 4, which is spirally grooved and is furnished at each end with collars 26 26, that are preferably square or angular in order to prevent the rod from rotating. This spirally-grooved rod will have an endwise movement during the process of coupling cars together or when the tractional strain due to drawing a heavily-loaded car is so great as to overcome the normal resisting strength of the springs with which the device is provided.

The frame for the mechanism may be of any suitable and desirable construction that will afford the necessary room and supports for the various parts. One form of frame, set forth here by way of example merely, comprises vertical longitudinal plates 7, having horizontal flanges 8. Perpendicular bolts 9, running through the flanges 8 and the sills or timbers 10 of the car, serve to fasten the frame-plates 7 rigidly and immovably beneath the car-flooring. At the rear end the plates 7 bend toward each other and are united by a plate 14, securely bolted to both of them. At the front end the plates 7 curve toward each other and are fastened firmly together by means of a plate 11, having an opening 13 and secured to the ends of the plates 7 by means of bolts 12. Through the opening 13 passes and reciprocates the draw-bar 1 belonging to the coupling member 2. Parallel to the vertical plates 7 and bolted thereto are vertical inside plates, having rectangular front sections 15 and rectangular rear sections 15ᵃ, the two sections of each plate being connected together by the integral middle neck 16.

Between the plate-sections 15 15 lies a casing A, and between the rear plate-sections 15ᵃ 15ᵃ lies a similar casing A'. These casings A and A' have sleeve portions containing springs C and C', and they also have square or angular flanges B and B', formed with tapering or beveled friction-rings $b$ and $b'$. The square or angular shape of the flanges B and B' enables the casings to be placed between the opposing vertical faces of the frame-plates 7 in such a way that the casings A and A' may be susceptible of a short sliding movement, but cannot rotate. The collars 26 at the ends of the spirally-grooved rod are situated in the respective casings A and A' and are square or angular to correspond with the shape of the interior of said casings, so that the spirally-grooved rod may not be able to rotate during such endwise movement as it may partake of in consequence of the movement of the coupler member by which it is carried and actuated. The flanges B and B' are provided with lateral notches D, that engage necks 16, as shown in Fig. 2. This engagement holds the mechanism in alinement and supports its weight under the strain of the operation of the parts. These casings A and A' are susceptible of a certain amount of endwise movement, as already stated; but such play as they have takes place between the inner ends of the plate-sections 15 and 15ᵃ, as shown in Figs. 1, 4, and 5, and such movement as they have is limited by the contact of the flanges B and B' with the ends of said plate-sections 15 and 15ᵃ—that is to say, said flanges will have only a trifling movement away from actual contact with said ends of the plate-sections and will be in actual contact with one or the other when there is sufficient strain on the parts as to involve a compression of one or the other of the springs C and C'. These springs are tensioned between the collars 26 on the spirally-grooved rod 4 and the interior shoulders E within the casings A and A'. The ordinary resiliency of the springs employed will be sufficiently strong to enable an empty car to be pulled or pushed without compressing the spring; but when the car is loaded one spring or the other, accordingly as the car is being drawn forward or backed, will be compressed to a greater or less degree in proportion to the force exercised on the draw-head.

On the spirally-grooved rod 4 is a wheel or roller 5, which is spirally grooved internally, so that it may engage the spirally-grooved shaft 4. As the shaft 4 is non-rotative, it will be evident that its endwise movement will cause a rotation of wheel 5. This wheel is formed with beveled or tapering friction-faces 6 and 6ᵃ, which are adapted to engage, respectively, with the beveled faces $b$ and $b'$ on the casing-flanges B and B'. When the power which acts to move the spirally-grooved rod 4 in one direction or the other is sufficient to cause a rotation of the wheel 5, said wheel will be pressed tightly against the friction-face $b$ or $b'$, while simultaneously the effect of compressing one or the other of the springs will be to cause the other friction-face to be brought tightly into contact with the wheel. Thus the rotative faces of the wheel will be tightly in contact with the non-rotative faces of the casings, and the tendency of the wheel to revolve will be impeded and obstructed by the frictional grip of the casing-flanges, so that although the endwise movement of the shaft 4 will cause necessarily something of a rotation of the wheel, yet the retardation of such rotation will have a converse effect of preventing an endwise movement of the shaft, and consequently the movement of the parts will not be great; but shocks varying in intensity and including those of very high degree may be sustained by the mechanism of my present invention without allowing the car or other structure with which the improvements may be employed to suffer any injury in consequence of the shocks or concussions.

In Fig. 5 I have represented a combination, with the shock-resisting mechanism, of brake-shoe-applying means. 25 25 denote examples of car-wheels, and 23 23 brake-shoes applied to said wheels, said shoes being pivoted to the interpivoted links 24 24, said links being offered here simply as a specimen arrangement of brake-shoe leverage. Secured to the rotative friction-wheel 5 is a chain 21, which is attached to a strong spring 22, that is in turn fastened to one of the links 24. The spring 22 serves to furnish a yielding connection between the friction-wheel 5 and the brake-shoe devices, and its elasticity will prevent too much power from being transmitted to the shoes as would cause a sliding or skidding of the wheels, for the yielding of the spring allows the shoes to ease up when the braking power becomes excessive. By this connection between the friction-wheel and the brake-shoes it will be seen that as the wheel 5 rotates in one direction or the other the shoes may be applied to or released from the wheels, and consequently the velocity of the wheels can be reduced, minimized, or graduated in any desired manner.

The operation of my improved mechanism will be evident from the foregoing description of the construction and relative arrangement of its parts. Though primarily designed for use in car coupling and buffing, with also an auxiliary relation to car-braking, it must be understood that the invention is broad in its adaptability and can be serviceably applied to various kinds of machinery where it is needful under certain conditions to reduce velocity or to provide a yielding appliance to sustain shocks, concussions, and recoils—as, for instance, in gun-carriages. Any agency which reciprocates the spirally-grooved rod will obviously tend to cause a rotation of the friction-wheel, and its rotation will be controlled by the gripping contact of the wheel with the friction-faces of the yielding casings. A severe blow given by one member of a car-coupler to the other in the act of coupling will be moderated and mitigated by this mechanism, so as to prevent injury to the cars. Manifold applications of the invention may be suggested and described; but inasmuch as a number of outlines thereof have been portrayed it is unnecessary to further detail the operation or enlarge upon the advantages of the invention.

Having thus described my invention, what I claim as new, and desire to secure by Letters Patent, is—

1. In a mechanism of the class described, a rectilineally-movable member in combination with a rotative element thereon, brake-shoe appliances, and a connection between said rotative element and said appliances.

2. In a mechanism of the class described, a rectilineally-movable member in combination with a rotative friction element thereon, yielding resistance elements for retarding the rotation of the friction element, brake-shoe appliances, and a connection between said rotative friction element and said appliances.

3. In a mechanism of the class described, a rectilineally-movable spirally-grooved rod, in combination with a friction-wheel thereon, brake-shoe appliances, and a connection between said wheel and said appliances.

4. In a mechanism of the class described, a spirally-grooved rod, in combination with a friction-wheel, brake-shoe-applying devices, and a yielding connection between the wheel and said devices.

Signed at Carthage, New York, this 10th day of June, 1903.

EDWARD G. SHORTT.

Witnesses:
   W. W. SWEET,
   F. E. SHORTT.